(12) United States Patent
Abert et al.

(10) Patent No.: US 8,164,216 B2
(45) Date of Patent: Apr. 24, 2012

(54) MODULAR ELECTRICAL SYSTEM AND METHOD FOR ITS OPERATION

(75) Inventors: Michael Abert, Au (DE); Werner Engl, Luhe-Wildenau (DE); Gunter Griessbach, Gelenau (DE); Gerald Hirmer, Mantel (DE); Arnold Klamm, Kandel (DE); Matthias Metzler, Karlsruhe (DE); Dirk Schmidt, Zschorlau/OT Albernau (DE)

(73) Assignee: Siemens Aktiengesellschaft, Munich (DE)

( * ) Notice: Subject to any disclaimer, the term of this patent is extended or adjusted under 35 U.S.C. 154(b) by 279 days.

(21) Appl. No.: 12/508,242

(22) Filed: Jul. 23, 2009

(65) Prior Publication Data

US 2010/0026309 A1 Feb. 4, 2010

(30) Foreign Application Priority Data

Jul. 31, 2008 (EP) .................................... 08013764

(51) Int. Cl.
*G01R 31/08* (2006.01)
(52) U.S. Cl. ........................................... 307/18; 307/12
(58) Field of Classification Search ............... 307/11–19
See application file for complete search history.

(56) References Cited

U.S. PATENT DOCUMENTS

| 4,833,338 | A | * | 5/1989 | Bartlett et al. .................. 307/17 |
| 6,055,647 | A | * | 4/2000 | Lacombe et al. ............... 714/14 |
| 6,504,266 | B1 | * | 1/2003 | Ervin .............................. 307/29 |
| 7,605,496 | B2 | * | 10/2009 | Stevens et al. ................. 307/17 |
| 7,895,455 | B2 | * | 2/2011 | Green et al. ................. 713/300 |
| 7,941,677 | B2 | * | 5/2011 | Penning ...................... 713/300 |
| 2003/0151309 | A1 | | 8/2003 | Hutton | |

FOREIGN PATENT DOCUMENTS

| DE | 102 52 292 A1 | 6/2004 |
| DE | 10 2004 035 126 A1 | 2/2006 |
| DE | 10 2005 039 886 A1 | 3/2007 |

* cited by examiner

*Primary Examiner* — Fritz M Fleming

(57) ABSTRACT

A modular electrical system including a first current-emitting source module and a first current-consuming sink module which is connected to the first current-emitting source module is provided. The first sink module has a first sink identification means to identify maximum power requirement of the first sink module. The object of providing power balancing between a first source module and a first sink module is achieved in that the first source module has a first source identification means for identifying the power capacity of the first source module, wherein in order to calculate a power ratio of the system the first sink identification means and the first source identification means are connected to a two-wire line for the purpose of generating a differential voltage.

11 Claims, 2 Drawing Sheets

MODULAR ELECTRICAL SYSTEM AND METHOD FOR ITS OPERATION

CROSS REFERENCE TO RELATED APPLICATIONS

This application claims priority of European Patent Office application No. 08013764.9 EP filed Jul. 31, 2008, which is incorporated by reference herein in its entirety.

FIELD OF INVENTION

The invention relates to a modular electrical system having a first current-emitting source module and a first current-consuming sink module that is connectable thereto, wherein the first sink module has a first sink identification means for identifying its maximum power requirement.

The invention also relates to a method for operating a modular electrical system of said kind.

BACKGROUND OF INVENTION

In modular electrical systems, such as for example in the case of a modularly constructed automation system, it is common practice to arrange different automation technology subassemblies on a backplane structure or a simple mounting rail and to interconnect them electrically. Said different subassemblies can then be basically distinguished according to subassemblies that assume the function of a source module, and subassemblies that assume the function of a sink module. Thus, a modularly designed automation system typically contains a CPU, at least one power supply subassembly, a plurality of peripheral subassemblies, and if necessary further subassemblies for communication purposes. The current-emitting power supply subassemblies are classified as source modules and the current-consuming subassemblies, such as for example a peripheral subassembly, are classified as sink modules.

During operation of the automation system, unpredictable spontaneous failures of the power supply subassemblies can occur both during the startup of the subassemblies and during operation, the spontaneous failures being caused due to the current-consuming subassemblies not being matched in terms of their power requirements to the current-emitting subassemblies.

At the time of configuring the aforementioned automation system, a user of the system decides what power output capacity of the power supply subassembly or subassemblies is sufficient for that particular system. If the available power is, for example, only slightly less in this case than the maximum required power, it can happen that an automation system initially operates totally without problems, but fails during operation due to apparently random environmental parameters. This failure can possibly occur only after a relatively long period of trouble-free operation.

The following scenarios are conceivable by way of example:

1. A system "powers up" apparently normally, but crashes spontaneously when all the peripheral subassemblies have been activated.
2. A system "powers up" apparently normally, but crashes spontaneously after reaching its operating temperature.
3. A system "powers up" normally, runs correctly for years, for example, but crashes spontaneously when a further peripheral subassembly is plugged in.

In the aforementioned cases there is an overload which often remains initially undetected by the automation system.

A modular system controlled as a function of its power requirements is known from DE 10 2005 039 886 A1. In said system, descriptor elements are arranged in each case in individual modules connected to a power supply, which descriptor elements indicate the power requirements of the individual modules. The total power requirements of all the connected individual modules can be calculated with regard to an overload by a primary module by means of the descriptor elements in the individual modules. A disadvantage with this system is that only the action of plugging in further individual modules is taken into account with regard to the total power requirements. If, for example, an additional power supply module is added to the system, this cannot be taken into account for calculating a power ratio between the current-consuming and the current-emitting modules.

SUMMARY OF INVENTION

It is therefore the object of the invention to extend a modular electrical system according to the prior art in such a way that power balancing or, as the case may be, the calculation of a power ratio also relates to the current-emitting subassemblies.

The object is achieved for the modular electrical system cited in the introduction in that the first source module has a first source identification means for identifying its power capacity, wherein in order to calculate a power ratio between the first source module and the first sink module of the system the first sink identification means and the first source identification means are connected to a two-wire line for the purpose of generating a differential voltage. In this case the two-wire line, on which the differential voltage is available as a result of the power balancing, can run through the entire modular system as a kind of two-wire bus. Advantageously, in contrast to a single-wire line, in which a "single-ended" configuration is established as a result of the connection of identification means to ground, fewer EMC problems are to be expected with the two-wire line. In the case of modules that are pluggable onto a backplane structure, for example, the two-wire line leads past each associated slot for the respective module and can be connected to the respective identification means by plugging in the module. In this case plug-in contacts are preferably configured in such a way that the contacts which lead to the identification means are configured as leading. In other words, before a module is connected to the system completely, the power balance can be determined in advance via the identification means.

In a preferred embodiment the two-wire line is connected to a primary module and the differential voltage can be evaluated in the primary module in order to detect an overload of the system. Means for evaluating the differential voltage are then preferably arranged in the primary module. Said means can be implemented for example by means of an interconnection of operational amplifiers that is familiar to the person skilled in the art. An output of such an operational amplifier circuit can then provide an analog signal which represents the power balancing as a value of, for example, 0-2. In this case a value less than 1 could signify that sufficient power is available from the source modules for the sink modules. A value equal to 1 would then signify that precisely as much power is available as is needed by the sink modules in terms of their power requirements.

According to a preferred technical solution in order to generate the differential voltage on the two-wire line, the first source identification means is embodied in such a way that current can be fed into the two-wire line by way of the first source identification means, and the first sink identification means is embodied in such a way that current can be extracted from the two-wire line by way of the first sink identification means. In this case the first source identification means could preferably be embodied as an active electrical element and the first sink identification means as a passive electrical element. Thus, the source modules are preferably embodied with a current source as source identification means and the sink modules with a current-consuming fixed resistor as sink identification means. The different loads due to the fixed resistors on the two-wire line and the different current injections fed into the two-wire line then lead to a differential voltage on the two-wire line, which differential voltage reflects the overall result.

In this case the first source identification means preferably has two identically acting electrical components. For reasons of symmetry the source identification means as active electrical element, which are preferably embodied as a current or voltage source, should be embodied as two identically acting components for the purpose of generating the differential voltage on the two-wire line. With voltage sources it is beneficial in this situation if one resistor in each case is connected in series in the interests of distributing the load.

It is also advantageous in the case of the sink identification means for these to have two identically acting passive electrical elements. This means, for example, that for a sink identification means consisting of fixed resistors one fixed resistor is present at one line each of the two-wire line and the two fixed resistors have the same resistance value.

In a particularly optimized embodiment the first identification means has a first connecting link, a second connecting link, a third connecting link and a fourth connecting link, the first connecting link being connected to a plus line and the fourth connecting link to a minus line of a supply voltage line and the second connecting link to a first conductor and the third connecting link to a second conductor of the two-wire line. By such a wiring interconnection of a source identification means or, as the case may be, also of a sink identification means, said means can be installed as simple identification means which can be electrically plugged into the modules. For example, if there is a change in the power requirements of a peripheral subassembly within a modular system, the operator of such a system can plug an identification means that is matched to the new conditions into the respective subassembly, such that ultimately the calculation of a meaningful power balance is ensured for the operation of the system as a whole.

The advantages of the device according to the invention become especially evident when a plurality of current-emitting source modules and a further plurality of current-consuming sink modules that are connectable thereto are present with corresponding source identification means and sink identification means, respectively. For example, all source modules and all sink modules are in this case connected in a parallel circuit arrangement to an energy supply bus which could also be located on the already mentioned backplane structure. It would also be conceivable that in the case of, for example, a configuration having only one source module and three sink modules, a further source module will be connected to the energy supply bus as necessary if there is a risk of the sink modules being undersupplied, as a function of the power balancing.

In the case of the method cited in the introduction for operating a modular electrical system, the object is achieved in that a first source identification means is provided for the first source module for the purpose of identifying its power output capacity, wherein in order to calculate a power ratio between the first source module and the first sink module of the system the first sink identification means and the first source identification means are connected to a two-wire line for the purpose of generating a differential voltage on the two-wire line. Thus, a differential voltage which reflects the ratio between an available power and a power that is to be consumed is available within the system.

If, in a next method step, the two-wire line is connected to a primary module, and the differential voltage is evaluated in the primary module for the purpose of detecting an overload of the system, a flexible response to a potential overloading of the system can be implemented for example by means of the generation of diagnostic or system alarms and measures can be taken to avoid a system failure.

In an advantageous development of the method, the first source identification means is embodied in such a way that current is fed into the two-wire line and the first sink identification means is embodied in such a way that current is extracted from the two-wire line.

As a result of the aforementioned generation of the differential voltage it can advantageously be decided prior to a system start whether the available power is greater than or equal to the maximally consumable power and the system is activated if a definable first ratio is undershot. If the first definable ratio, which is calculated on the basis of the differential voltage, were to exceed a specific value, a signal is preferably generated which prevents a "powering up" of the system.

According to the method it is advantageous if, following activation of the system, a second ratio is used for monitoring an overload, the second ratio being selected greater than the first ratio in order to minimize the risk of an incorrect decision due to faults on the two-wire line. If, on the basis of the differential voltage, the second ratio assumes a value of, for example, 1.2, which represents a temporary overload of 20%, the primary module can tolerate this for a short time with a corresponding evaluation unit and respond with a corresponding generation of fault messages or diagnostic alarms only if the overload persists for a longer period. Temporary faults which can lead to the differential voltage being distorted can be caused by EMC interference, for example. Said EMC malfunctions are produced, for example, due to noise signals being coupled-in, which noise signals are possibly generated as a result of the connection of electrical loads which are located in the vicinity of the two-wire lines. Accordingly, said method and also the above-described system with its two-wire line will be used advantageously in EMC-contaminated environments comprising spatially distributed components. In contrast, with power balancing according to the prior art with a single-wire line, extreme deviations in the corresponding measured values would be likely in the case of EMC interference, which would fundamentally call into question the procedure according to the method of power balancing according to the prior art.

BRIEF DESCRIPTION OF THE DRAWINGS

An exemplary embodiment and further advantages of the invention are explained below with reference to the drawing, in which.

DETAILED DESCRIPTION OF INVENTION

Figure 1:
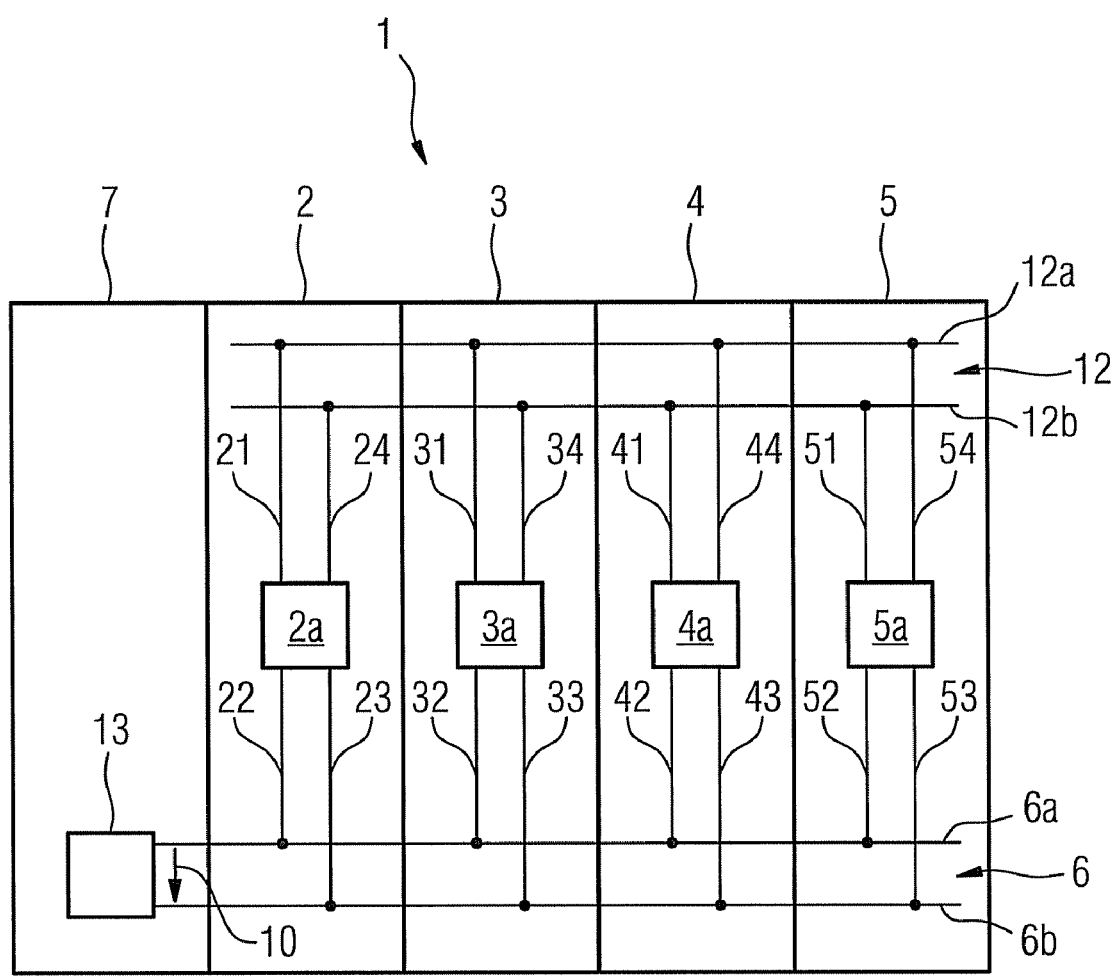
FIG. 1 shows a modular system.

FIG. 1 shows a modular electrical system 1. In this arrangement the system 1 has a first source module 2, a second source module 3, a first sink module 4 and a second sink module 5 as pluggable subassemblies on a backplane structure, which in combination with a primary module 7 form an automation system.

A two-wire line 6 having a first conductor 6a and a second conductor 6b, embodied as a two-wire bus, runs through the entire automation system, starting from the primary module 7 and continuing via the modules 2, . . . ,5. In order to connect to the two-wire line the first source module 2 has a first source identification means 2a and the second source module 3 has a second source identification means 3a. The source identification means 2a,3a of the source modules 2,3 represent the power that is available by way of the source modules 2,3. A first sink identification means 4a that is available in the first sink module 4 and a second sink identification means 5a that is available in the second sink module represent the power that is to be consumed in each case by the sink modules 4,5, respectively.

The source/sink identification means 2a,3a,4a and 5a each have four connecting links for connecting to the two-wire line 6 and for connecting to a supply voltage line 12. In this case the supply voltage line 12 is formed by means of a plus line 12a and a minus line 12b. The first source identification means 2a is connected via a first connecting link 21 to the plus line 12a for the purpose of feeding a current via a second connecting link 22 into the first conductor 6a of the two-wire line 6. To ensure symmetrical feeding, the first source identification means 2a is also connected via a fourth connecting link 24 for the purpose of feeding a current into the first conductor 6b of the two-wire line 6 via a third connecting link 23 to the minus line 12b.

Figure 2:
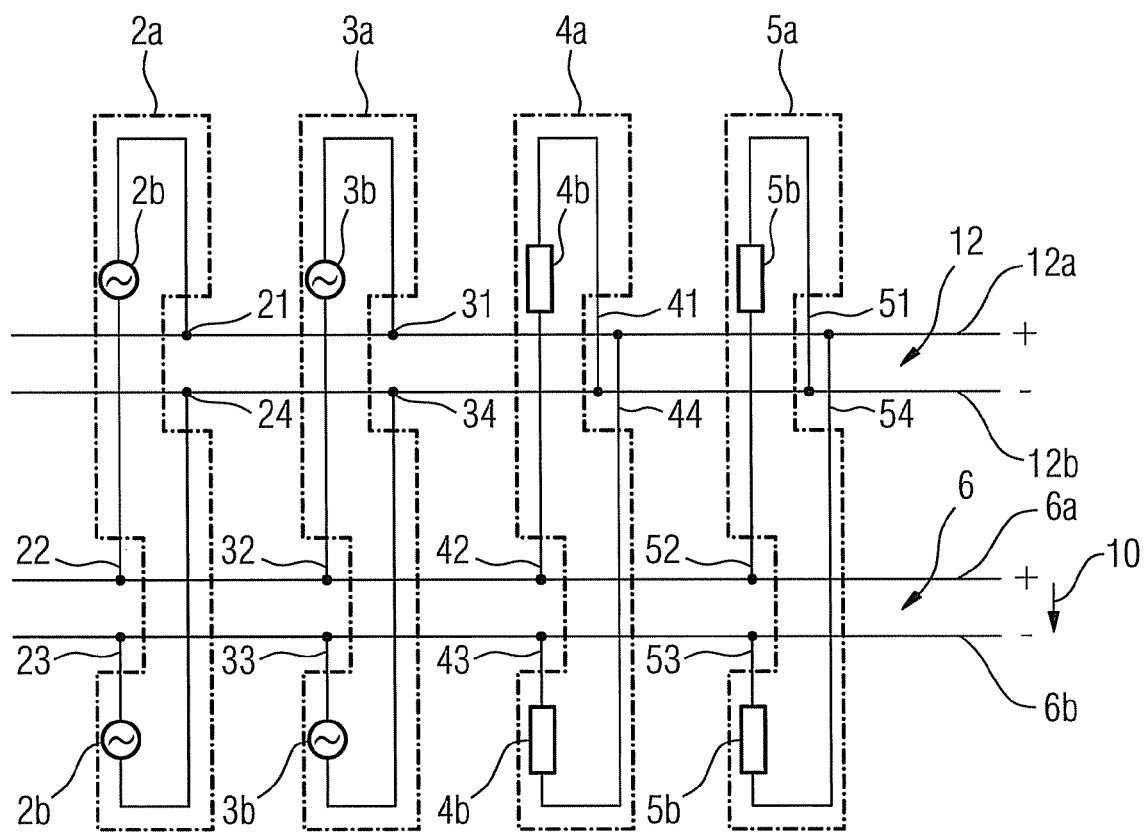
FIG. 2 shows an interconnection arrangement of identification means on a two-wire line.

The method of connection for the second source identification means 3a via its four connecting links 31, . . . ,34 is the same as the method of connection of the first source identification means 2a. In the case of the source identification means 2a,3a, the current that is to be fed in is generated by way of their respective current sources 2b and 3b, as shown in greater detail in FIG. 2. The two current sources 2b are two identically acting current sources, each of which feeds an equal proportion of current into the first conductor 6a and into the second conductor 6b, respectively. The two current sources 2b are therefore labeled with the same reference sign.

Exactly the same scenario applies in the case of the two current sources 3b of the second source identification means 3a, except that here the current intensity that is to be injected by the current source 3b differs from that of the current source 2b because the second source module 3 provides a greater power capacity than the first source module 2.

The first sink identification means 4a also has two identically acting components. In this case they are two fixed resistors 4b, each of which has the same resistance value. In order to achieve a symmetrical load on the two-wire line 6, a first fixed resistor 4b of the two identically acting fixed resistors 4b is connected by means of a second connecting link 42 of the first sink identification means 4b to the first conductor 6a of the two-wire line and by means of a fourth connecting link 44 to the minus line 12b of the supply voltage line 12. Conversely, the further fixed resistor 4b is connected via a third connecting link 43 to the second conductor 6b of the two-wire line 6 and via a fourth connecting link 44 to the plus line 12a. By means of this method of connection the two-wire line 6 is symmetrically loaded and consequently a partial differential voltage corresponding to the load can be generated on the two-wire line 6.

The method of connection of the two fixed resistors 5b of the second sink identification means 5a is in turn similar, except that in this case the resistance value of the fixed resistor 5b is different from the resistance value of the fixed resistor 4b.

To sum up it can be said that the check on the power balance is carried out via a differential signal line. The differential signal line is loaded by the sinks via fixed resistors proportionally to their maximum power ratings. The sources, on the other hand, feed currents via fixed resistors or via current sources into the differential signal line in each case in proportion to their maximum power capacities. In this case the currents of the current sources feed in the equivalent, referred to the resistance method. The result of the balancing is a differential voltage 10 on the two-wire line 6, which differential voltage becomes more positive as power reserves increase and more negative with potentially missing power.

In the case of equilibrium, when there is a maximum demand for 100% of the available power, the differential voltage is zero.

The differential voltage 10 is evaluated by way of a means for evaluating the differential voltage 13 which, according to FIG. 1, is disposed inside the primary module 7. Following evaluation of the differential voltage 10, the means 13 can generate corresponding signals for the primary module 7 which are in turn used to protect the system 1 against an overload or accordingly to "power down" the system 1 using suitable measures. It is also conceivable for a further subassembly which is also embodied as a source module to be connected to the system 1 dynamically as a result of a process signal.

The invention claimed is:
1. A modular electrical system, comprising:
a supply voltage line comprising a first voltage line a second voltage line, each having a respective voltage polarity, which is different relative to one another;
a two-wire line comprising a first line and a second line;
a first current-emitting source module having a first connecting link and a second connecting link respectively coupled to the first and second voltage lines of the supply voltage line, and further having a third connecting link and a fourth connecting link respectively coupled to the first and second lines of the two-wire line, the first current-emitting source module including a first source identification circuit, which includes at least one current source electrically coupled between one of the first and second voltage lines of the supply voltage and one of the first and second lines of the two-wire line, said at least one current source coupled to inject an amount of source current arranged to identify a power source capacity of the first current-emitting source module; and
a first current-consuming sink module having a first connecting link and a second connecting link respectively coupled to the first and second voltage lines of the supply voltage, and further having a third connecting link and a fourth connecting link respectively coupled to the first and second lines, the first current-consuming sink module connected in parallel circuit to the first current-emitting source module, the first current-consuming sink module including a first sink identification circuit, which includes at least one resistive element electrically coupled between one of the first and second voltage lines of the supply voltage and one of the first and second lines of the two-wire line, said at least one resistive element coupled to sink an amount of sink current arranged to identify a maximum power consumption requirement of the first current-consuming sink module,
wherein a differential voltage is generated between the first and second lines of the two-wire line, the differential voltage resulting from a difference between source current and sink current, wherein the differential voltage is indicative of a power balance between the first current-emitting source module and the first current-emitting sink module of the modular electrical system.

2. The modular electrical system as claimed in claim 1,
wherein the two-wire line is connected to a primary module,
wherein the differential voltage is evaluated by an evaluator module in the primary module, and
wherein the differential voltage is at least evaluated to detect an overload of the modular electrical system.

3. The modular electrical system as claimed in claim 1, wherein the first source identification circuit includes a further current source electrically coupled between another one of the first and second voltage lines of the supply voltage and another one of the first and second lines of the two-wire line.

4. The modular electrical system as claimed in claim 3, wherein the first sink identification circuit includes a further resistive element electrically coupled between said another one of the first and second voltage lines of the supply voltage and said another one of the first and second lines of the two-wire line.

5. The modular electrical system as claimed in claim 1,
wherein a plurality of current-emitting source modules and a plurality of current-consuming sink modules are connected in parallel circuit to one another between the supply voltage line and the two-wire line, and
wherein each current-emitting source module includes a corresponding source identification circuit and each current-consuming sink module includes a corresponding sink identification circuit.

6. A method for operating a modular electrical system, comprising:
providing a supply voltage line comprising a first voltage line and a second voltage line, each configured to have a respective voltage polarity, which is different relative to one another;
providing a two-wire line comprising a first line and a second line;
connecting in parallel circuit a first current-emitting source module having a first connecting link, a second connecting link, a third connecting link and a fourth connecting link with a first current-consuming sink module having a first connecting link, a second connecting link, a third connecting link and a fourth connecting link;
respectively coupling the first and second connecting links of the first current-emitting source module to the first and second voltage lines of the supply voltage;
respectively coupling the third and fourth connecting links of the first current-emitting source module to the first and second lines of the two-wire line;
respectively coupling the first and second connecting links of the first current-consuming sink module to the first and second voltage lines of the supply voltage;
respectively coupling the third and fourth connecting links of the first current-consuming sink module to the first and second lines of the two-wire line;
providing the first current-consuming sink module with a first sink identification circuit;
electrically coupling in the first sink identification circuit at least one resistive element between one of the first and second voltage lines of the supply voltage and one of the first and second lines of the two-wire line, said at least one resistive element coupled to sink an amount of sink current arranged to identify a maximum power consumption requirement of the first current-consuming sink module;
providing the first current-emitting source module with a first source identification circuit;
electrically coupling in the first source identification circuit at least one current source between one of the first and second voltage lines of the supply voltage and one of the first and second lines of the two-wire line, said at least one current source coupled to inject an amount of source current arranged to identify a power source capacity of the first current-emitting source module;
generating a differential voltage between the first and second lines of the two-wire line, by connecting the first sink identification circuit and the first source identification circuit to the two-wire line, the differential voltage resulting from a difference between source current and sink current, wherein the differential voltage is indicative of a power balance between the first current-emitting source module and the first current-emitting sink module of the modular electrical system; and
based on a value of the generated differential voltage, determining the power balance between the first current-emitting source module and the first current-consuming sink module.

7. The method as claimed in claim 6, further comprising:
connecting the two-wire line to a primary module,
evaluating the differential voltage in an evaluator module of the primary module, and
wherein the evaluating of differential voltage comprises at least detecting an overload of the modular electrical system.

8. The method of claim 6 further comprising:
electrically coupling in the first source identification circuit a further current source between another one of the first and second voltage lines of the supply voltage and another one of the first and second lines of the two-wire line; and
electrically coupling in the first sink identification circuit a further resistive element between said another one of the first and second voltage lines of the supply voltage and said another one of the first and second lines of the two-wire line.

9. The method of claim 8 further comprising:
connecting in parallel circuit to one another a plurality of current-emitting source modules and a plurality of current-consuming sink modules between the supply voltage line and the two-wire line, wherein each current-emitting source module includes a corresponding source identification circuit and each current-consuming sink module includes a corresponding sink identification circuit.

10. The method as claimed in 9, further comprising:
deciding, prior to a system start, whether an available power is greater than or equal to a maximally consumable power on the basis of the differential voltage and activating the modular electrical system if a definable first ratio, calculated on the basis of the differential voltage, is less than a specific value.

11. The method as claimed in claim 10,
wherein following an activation of the modular electrical system, a second ratio is used for monitoring an overload, and
wherein the second ratio is selected greater than the first ratio in order to minimize a risk of an overload being declared due to temporary faults on the two-wire line.

* * * * *